June 22, 1965 A. FEINER 3,191,152

MAGNETIC FERREED COUNTING CIRCUIT

Filed Dec. 27, 1962

INVENTOR
A. FEINER
BY
S E Hollander
ATTORNEY

United States Patent Office 3,191,152

Patented June 22, 1965

3,191,152

MAGNETIC FERREED COUNTING CIRCUIT

Alexander Feiner, Holmdel Township, Morris County, N.J., assignor to Bell Telephone Laboratories, Incorporated, New York, N.Y., a corporation of New York Filed Dec. 27, 1962, Ser. No. 247,678
10 Claims. (Cl. 340—168)

Figure 1:
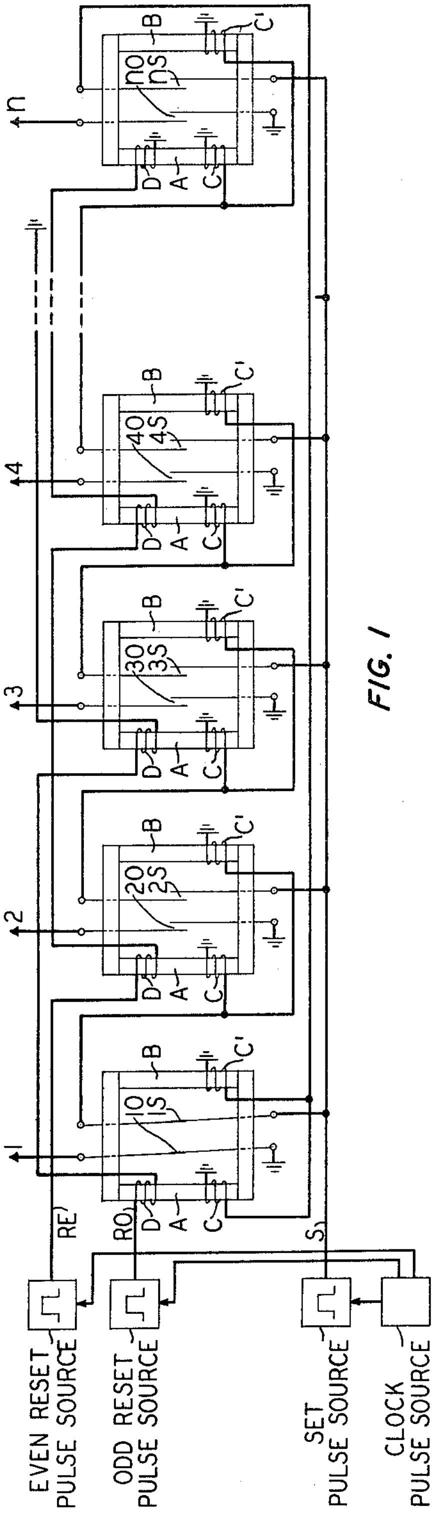

This invention relates to counting circuits and more particularly to ferreed counting circuits wherein the circuit logic includes, as elements, disparities in response time between the magnetic core of the ferreed and the contacts of the ferreed, and also disparities in the operate and release time of the ferreed contacts.

In the past, counting circuits for use in telephone switching systems have been designed for compatibility with electromechanical telephone central offices and have often included, as a result, the traditional electromechanical relay as the fundamental bistable element. Recent developments in the field of telephone switching have been directed, to a considerable extent, toward electronic central offices and electronic telephone switching systems.

These developments give rise to the problem of compatibility between electronic central offices and conventional or electromechanical central offices, particularly when it becomes necessary to convey information therebetween. For example, if it is assumed to be necessary to convey a telephone directory number received from an electronic central office to a conventional electromechanical telephone office, the information delivery rate from the electronic office would presumably be in the order of microseconds as is consonant with the rate of operation of electronic equipment. Since this speed of reception of information far exceeds the capacity of conventional electromechanical offices, a barrier at the "interface" between the two offices is raised.

Fortunately this problem has been anticipated and largely transcended by the development of a versatile component for bridging the gap between electronic and electromechanical systems. This device is the ferreed which is described in an article in the Bell System Technical Journal, January 1960, vol. 38, at page 1.

The essential attribute of the ferreed which provides its capability in linking electronic and electromechanical systems is the dual or split response time of the ferreed device. Thus, the ferreed includes a remanent magnetic core which may be influenced by windings thereon, and contacts disposed in the area of the field generated by the core. When the field is in a first direction, the contacts close; in the opposite direction the contacts are opened. The magnetically remanent material responds relatively instantaneously to applied signals on the windings of the core and by virtue of its properties of remanence "remembers" the applied signal. In the interim the physical metallic contacts are influenced by the change in direction of the magnetic field but, characteristically, as a result of inertia do not respond until a substantial elapsed time period after the response of the core itself. Since the ferreed response is in two stages, first the core and then the contacts, an ideal device for providing compatibility between microsecond electronic systems and much slower electromechanical systems is available.

Returning now to the problem of conveying information from an electronic central office to an electromechanical office, it is apparent that a counter in the electromechanical office which is adapted to respond to microsecond impulses from the electronic office while providing an output of much longer duration is highly desirable.

In certain prior art in which ferreed counters were adapted to perform this function, the inherent time lag between the response of the contacts and the response of the core was viewed as necessary in establishing the required compatibility and the circuitry was adapted to work in conjunction with the delays thus encountered. In short, the time delay thus encountered was accepted as a necessary hindrance for obtaining the desired end.

It is therefore an object of this invention to provide a ferreed circuit in which the time delay intervening between the response of the magnetic core and the response of the contacts is utilized as an element in the switching logic of the circuit.

It will be noted from reference to the above-referred-to Bell System Technical Journal article that the time required to operate the contacts in certain ferreeds after the magnetic core itself has been "set" is illustratively 450 microseconds while the time required to release the same contacts may be much less—illustratively 20 microseconds. Here again, in certain prior art arrangements, the disparities in operating and release time have been viewed as inherent, immutable characteristics of the ferreed which the designer must contend with in developing circuits which incorporate such ferreeds. In consequence, these prior art circuits did not attempt to exploit the substantial difference in the times required to operate and release the same contacts but instead passively accepted the disparities as additional design encumbrances for the circuit desired.

It is therefore a further object of this invention to provide a ferreed counting circuit which incorporates as an element of the circuit logic the disparities between operating and release times of the ferreed contacts.

A number of prior art ferreed circuits which were designed to prevent the interruption of current by the ferreed contacts in the circuit were predicated on the necessity of applying an input pulse to the winding on the ferreed core which was substantially shorter than the time required to release the ferreed contacts. Since, as indicated above, this time period may illustratively be in the order of 20 microseconds, a relatively short critical boundary for the input pulse width must be enforced in the circuit design—again encumbering the flexibility otherwise available to the designer.

It is therefore an object of this invention to provide a ferreed ring counter circuit wherein the operation of the counter is independent of the release time of any ferreed contacts in the circuit.

As indicated above, one of the essential functions which a ferreed ring counter is capable of executing is the provision of a link between the electronic and electro-mechanical telephone systems. In counters of this nature, it is often essential to limit the operation of the bistable devices in the counting chain to "one and only one" device at any particular instant. Certain previous arrangements of this kind which were designed to satisfy these restrictions were somewhat literal in compliance with the requirement. Thus, certain prior art ferreed ring counters were arranged to permit the energization to a "set" state of only one core in the chain at any particular time. When viewed historically, these arrangements are shown to be derivative of prior art investigations concerned with gas tubes and transistors—devices which are relatively unitary in their response to externally applied signals. Since the ferreed device, as discussed above, presents a divided or split time response to applied signals, it would not be inconsonant with the "one and only one" requirement of counting circuits to nevertheless arrange for simultaneous or concurrent "set" states in two adjacent cores provided that the ferreed contacts themselves are operated on a "one and only one" basis. As will be shown herein, a number of decisive operational advantages flow from this apparent breach of the "one" and only one" rule.

It is therefore a further object of this invention to provide a ferreed counting circuit wherein two adjacent stages may be in the "set" state at a particular time although the contacts of adjacent stages in the counter are operated strictly on a "one and only one" basis.

These and other objects and features of the invention may be achieved in one specific illustrative embodiment in which a group of parallel ferreeds of the type described in Patent 2,995,637 of August 8, 1961, of Feiner et al. are connected to form a ring counter. Each ferreed includes a set winding on both legs of the ferreed and also a reset winding on the switching leg of the ferreed. In operation, one of the legs or remanent branches is continuously polarized in the same direction while the remanence of the other branch is reversible and may be switched by delivering an appropriate pulse to the reset winding. Two separate and electrically distinct reset buses are utilized. An even reset bus is connected to the reset windings of all even stages and an odd reset bus is connected to the reset windings of all odd stages.

In operation it may be assumed that a particular stage is set, for example stage 2. Since one of the pairs of contacts of stage 2 is connected as a steering input to the succeeding stage 3, the following set pulse will be delivered through the closed contacts of stage 2 to the set winding of stage 3 to set that stage. As indicated in the article referred to above, the remanence of the switching leg is shifted within a microsecond interval after the set pulse but the ferreed contacts of the third stage require a substantially greater time, illustratively in the order of 450 microseconds to close. Prior to the time that the contacts of stage 3 close, stage 2 is reset by a pulse on the even reset bus. As a result of the resetting of stage 2, the contacts of stage 2 are opened to interrupt the output indication from stage 2 within an interval, for example, in the order of 20 microseconds after the magnetic remanence of the core in stage 2 is shifted.

Thereafter, upon the eventual operation of the contacts of stage 3, it is seen that the stage 2 contacts have already opened and in consequence only a single output indication is provided—at the contacts of stage 3.

It will be noted that the operation of the counter is predicated on the fact that a set pulse can be delivered to stage 3 to set stage 3 and to initiate the operation of the contacts thereat and nevertheless permit the resetting of stage 2 and release of the contacts of stage 2 prior to the closure of the contacts of stage 3. Thus, there are two distinct time disparities which operate to advantageously permit stepping of the counter. These include the time disparity between the shifting in magnetic remanence of the switching leg of the ferreed and the subsequent closure of the contacts and also the disparity in closure and release times of the ferreed contacts. Both factors are exploited as elements of the switching logic in advancing the counter.

A feature of this invention is a counter circuit including two electrically distinct reset buses.

Another feature of this invention includes a counter circuit in which interstage steering is accomplished by the ferreed contacts of a preceding stage.

A further feature of this invention includes arrangements for concurrently shifting the magnetic remanence of two adjacent stage cores in a ring counter while operating the output contacts of the two stages on a "one and only one" basis.

Still another feature of this invention includes arrangements for exploiting the disparity in closure and release time of a ferreed by releasing selected ferreed contacts during the operation of the contacts of a succeeding stage.

Figure 2:
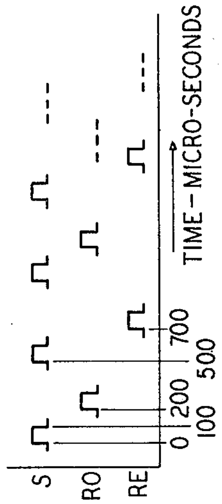
Figure 3:
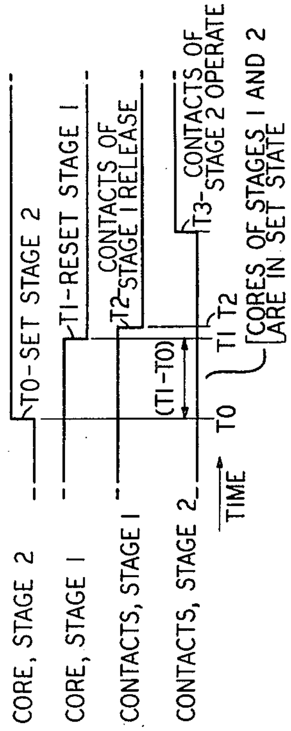

These and other objects and features of the invention may be more readily comprehended from an examination of the following specification, appended claims and attached drawing in which:

FIG. 1 discloses a specific illustrative embodiment of the counter circuit of applicant's invention;

FIG. 2 graphically indicates the pulse sequence on a time axis of the set and reset pulses; and FIG. 3 graphically represents the time relationships of core remanence changes and corresponding action of the ferreed contacts.

Referring now to FIG. 1, it is apparent that the ring counter includes "*n*" stages in which each stage comprises two parallel remanent magnetic branches. It is seen that the remanent magnetic branch B of each of the stages is continuously polarized by the set pulse in the same direction and does not change in magnetic remanence since it does not include a reset winding. A set winding C and C′ on each leg of each ferreed stage is adapted to drive a magnetic flux through the leg in a direction which is arbitrarily designated as the "set" direction. The "switching" leg A of each stage is adapted to be shifted in magnetic remanence by the appropriate energization of set winding C or reset winding D. A "soft" or nonremanent magnetic material couples both legs of the ferreed.

The remaining stages are substantially similar to stage 1 with the exception that even stages are reset by a separate bus RE. A clock pulse source is illustratively utilized to determine the set and reset pulse sequence in accordance with the time periods shown in FIG. 2. The pulse sources are all well-known prior art devices and their details are omitted as unessential to an understanding of the present invention and to preserve clarity.

For purposes of illustration, it will be assumed that stage 1 is set (as shown in FIG. 1), or that the remanent magnetic flux in the switching leg A is in the upward direction and all other stages are reset. The initial set pulse as shown in FIG. 2 (line S) is now delivered over the set conductor S from a source of set pulses. Since stage 1 is set, the contacts of stage 1 are closed and the pulse travels through the steering contacts 1S through set windings C and C′ of stage 2 to ground. This delivers a flux in the upward direction in the switching leg of stage 2 to set that stage and to initiate the closure of the steering contacts 2S and the output contacts 20 of stage 2.

At this juncture it is significant to observe that the switching leg A of stage 2 is now "set" in response to the set pulse, as described, even though stage 1 is not yet reset. Since an essential characteristic of ring counter circuitry of the type described is the fact that one (and only one) stage is operative at a time, the situation thus described would appear to be anomalous. However, as will be shown, the output contacts 10 for stage 1 and 20 for stage 2 are never closed at the same time. Consequently, although both magnetic remanent elements in stages 1 and 2 may be concurrently set, the external circuitry connectable to the output contacts 10, 20, etc., cannot detect this operation and instead can "see" only a disjunctive type of operation in which the individual output contacts are sequentially energized, one at a time.

Returning now to the operation, during the period that the contacts of stage 2 are beginning to operate, a reset pulse is delivered on conductor RO to reset stage 1 as shown at line RO of FIG. 2. This pulse, since it is common to all odd stages also resets all other odd stages, but since stage 1 is the only odd stage previously set, it is the only stage which resets. When stage 1 is reset, the contacts of stage 1 begin to release. Since these contacts may release in the order of 20 microseconds, as described in the Bell System Technical Journal article referred to above, the contacts of stage 1 will open considerably in advance of the closure of the contacts of stage 2 which illustratively requires in the order of 450 microseconds as shown graphically in FIG. 3. (FIG. 3 is explained in detail herein.) Since the contacts 10 (and 1S) are released substantially in advance of the closure of the contacts of stage 2, a double output indication is prevented.

When the contacts of stage 2 close, contacts 20 and 2S are operated preparing a path for the routing of the next set pulse to stage 3. Thus, when the following set pulse is applied to conductor S, as shown at line S of FIG. 2, a path may be traced over the contacts of 2S to the set windings C and C′ of stage 3 to set stage 3. Since the flux applied by winding C′ is in the direction of the existing field in leg B, no change occurs therein. In leg A, however, the magnetic remanence is shifted. As before, the contacts 3S and 3O of stage 3 respond only after a substantial delay of approximately 450 microseconds. Prior to the expiration of this interval, a pulse is delivered on conductor RE as shown in FIG. 2, line RE, to reset stage 2. In resetting stage 2, the contacts 2S and 2O respond (open) in approximately 20 microseconds and therefore substantially in advance of the closure of the contacts of stage 3. When the contacts 3S and 3O are closed after the contacts 2S and 2O are opened, the counter is ready for the following set pulse to which the circuit responds in a manner analogous to that described for stage 1.

The remaining stages of the counter are energized in an analogous manner according to the program shown in FIG. 2.

Referring specifically now to FIG. 3, a time sequence chart is shown which indicates graphically the setting and resetting of the magnetic states of adjacent stages and also the condition (opened or closed) of the contacts of the same stages. Assuming that stage 1 is in the set condition, at time T0 the set conductor is energized over a path including the steering contacts of stage 1 (which are closed at time T0) to excite the set windings C and C′ of stage 2. For purposes of simplicity, it is assumed that the magnetic flux reversal in stage 2 is instantaneous at time T0 although in practice the ferrite switching time requires several microseconds.

It is significant to note that since stage 1 is also by definition in the set condition, at time T0 and for some time thereafter both stages 1 and 2 are in the same magnetic state.

At time T0 when stage 2 was set, the contacts of stage 2 immediately begin to operate but require a time period in the order of illustratively 450 microseconds to close as shown at time T3. In consequence, when, at time T1 (e.g., 200 microseconds after T0) conductor RO is energized to reset stage 1, the contacts of stage 1 begin to release and do so in a much shorter period of time, illustratively 20 microseconds as shown at time T2. After time T2, the output contacts of stage 1 are released as are the steering contacts of stage 1 whereas the contacts of stage 2 are still not yet operated. At the expiration of the illustrative time delay as shown at time T3 the contacts of stage 2 are closed and an output is available at contacts 2O. Moreover, contacts 2S are closed to route the next set pulse through the set windings C and C′ of stage 3. It is seen therefore that the contacts of stage 1 and stage 2 are never simultaneously operated even though the magnetic states of stage 1 and stage 2 may for some time (actually, T1–T0) be identical in view of the disparity between the release time of the contacts of stage 1 and the time to operate required by the contacts of stage 2.

Moreover, the ability of the circuit to tolerate concurrent set states in adjacent stages permits the resetting of a particular core to take place independent of the pulse width of the set pulse source. Thus, if stage 1 had to be reset at the instant that stage 2 is set, the set pulse width should necessarily be limited to a time shorter than the release time of the contacts of stage 1 to prevent undesirable arcing at the contacts of stage 2 when the set current is interrupted.

Since the resetting of stage 1 need not occur until a substantially later time (determined by the operating time of the contacts of stage 2) correspondingly enhanced flexibility and less critical margins are afforded the user. Thus, the set pulse width may illustratively be 100 microseconds (i.e., longer than the contact release time) without adverse effect on circuit performance.

It will be noted that the disjunctivity in the output indications is preserved by the procedure for releasing the output contacts of a preceding stage during the operation of the contacts of the succeeding stage but prior to their closure. This arrangement is predicated on the exploitation of the disparity in operating time of the contacts as compared to the release time of the contacts thereby permitting two adjacent stages to be magnetically in the same state but preventing the output contacts of the same stages from being in the same state at any time.

It is to be understood that the above-described arrangements are illustrative of the application of the principles of the invention. Numerous other arrangements may be devised by those skilled in the art without departing from the spirit and scope of the invention.

What is claimed is:

1. A ferreed circuit including a plurality of ferreed stages, each stage including steering contacts and output contacts having a contact operating time substantially greater than the contact release time, a set conductor, means for coupling said set conductor to each of said stages, reset conductors, means for coupling said reset conductors to said stages, means for connecting the steering contacts of a particular stage intermediate said set conductor and said means for coupling said set conductor to said succeeding stage, and means for energizing said conductors in sequence to propagate a signal stored in one of said ferreed stages including means for energizing said reset conductor to release said output contacts of said particular stage in a time period following the setting of a succeeding stage which is less than the contact operating time of said output contacts of said succeeding stage.

2. A ferreed circuit including a plurality of cascaded ferreed stages, each stage including steering contacts having a contact operating time substantially greater than the contact release time, a set conductor, means for coupling said set conductor to each of said stages, two reset conductors, means for coupling said two reset conductors respectively to alternate ones of said stages, means for connecting the steering contacts of a particular stage intermediate said set conductor and said means for coupling said set conductor to said succeeding stage, and means for energizing said set conductors and reset conductors in sequence to advance a signal stored in one of said stages including means for energizing said reset conductors to release said contacts of said particular stage in a time period subsequent to the setting of a succeeding stage which is less than the contact operating time of said contacts of said succeeding stage.

3. A ferreed circuit including a plurality of cascaded ferreed stages, each stage including steering contacts and output contacts, a set conductor, means for coupling said set conductor to said stages, reset conductors, means for coupling said reset conductors to said stages, each of said stages including magnetically remanent means responsive to the energization of said conductors for controlling said contacts, and means including said steering contacts for propagating a signal stored in one of said stages and for driving the magetic remanent means of two adjacent stages to the same magnetic state while maintaining the output contacts of said adjacent stages in the operated and released conditions, respectively.

4. A ferreed ring counter circuit including a plurality of cascaded ferreed stages, each stage including magnetic remanent means and steering contacts and output contacts having a contact operating time substantially greater than the contact release time, a set conductor, means for coupling said set conductor to each of said stages for driving said magnetic remanent means to a particular magnetic state, two reset conductors, means for coupling said reset conductors respectively to alternate ones of said stages for driving said magnetic means to opposite magnetic states, means for connecting the steering contacts of a particular stage intermediate said set conductor and said means for coupling said set conductor to said succeeding stage, and means for advancing a signal stored in said counter including means for driving said magnetic means of two adjacent stages to the same magnetic state while maintaining said output contacts of said stages in the operated and released conditions, respectively.

5. A ferreed ring counter circuit including a plurality of ferreed stages, each of said stages including magnetic remanent means and output and steering contacts having a contact operating time greater than the contact release time, a set conductor, means for coupling said set conductor to said stages, reset conductors, means for coupling said reset conductors to said stages to drive said magnetic means to selected magnetic states, means for connecting the steering contacts of a particular stage intermediate said set conductor and said means for coupling said set conductor to a succeeding stage, means for energizing said set conductor and reset conductors to advance said counter including means for delivering a set pulse over said set conductor and said steering contacts of a particular stage to energize said magnetic means of a succeeding stage to change the magnetic state of said stage, and means for thereafter resetting said magnetic means of said particular stage to release said steering contacts of said particular stage prior to the termination of said set pulse and to close said contacts of said succeeding stage subsequent to the termination of said set pulse.

6. A ferreed ring counter circuit including a plurality of ferreed stages, each stage including a magnetic remanent member having a set winding and a reset winding thereon, steering contacts and output contacts having a contact operating time substantially greater than the contact release time, a set conductor coupled to each of said set windings and adapted to drive said magnetic members to a first magnetization state, two reset conductors respectively coupled to said reset windings of alternate ones of said stages for driving said magnetic members to the opposite magnetization state, means for connecting the steering contacts of a particular stage intermediate said set conductor and said set winding of a succeeding stage, and means for energizing said conductor in sequence to advance said counter including means for energizing said reset conductors to release said output contacts of a particular stage in a time period following the setting of said particular stage which is less than the contact operating time of said output contacts of said succeeding stage.

7. A ferreed ring counter circuit including a plurality of ferreed stages, each of said stages including two magnetically remanent elements, set windings adapted when energized to drive said magnetic elements to a particular magnetization state, a reset winding adapted when energized to drive one of said magnetic elements to the opposite magnetization state, steering contacts and output contacts having a contact operating time greater than the contact release time, a set conductor coupled to said set windings of each of said stages, a first reset conductor coupled to said reset windings of even ones of said stages, a second reset conductor coupled to said reset windings of odd ones of said stages, means for connecting the steering contacts of a particular stage intermediate said set conductor and the set winding of a succeeding stage in the ring, and means for energizing said conductors in a sequence which includes the energization of said set conductor, the energization of said first reset conductor, the additional energization of said set conductor and the energization of said second reset conductor to advance said counter.

8. A ferreed ring counter circuit including a plurality of ferreed stages, each stage including a first and second magnetic remanent member, said first member having a set winding and a reset winding thereon, said second member having a set winding thereon, steering contacts and output contacts magnetically coupled to each of said stages, said contacts having a contact operating time substantially greater than the contact release time, a set conductor connectable to each of said set windings and adapted to drive said members to a first magnetization state, two reset conductors respectively coupled to said reset windings of alternate ones of said stages for driving said first magnetic members to the opposite magnetization state, means for connecting said steering contacts of a particular stage intermediate said set conductor and said set windings of a succeeding stage, and means for advancing said counter including means for energizing said reset conductors to release said output contacts of a particular stage in a time period following the setting of said particular stage which is less than the contact operating time of said output contacts of said succeeding stage.

9. A ferreed ring counter circuit including a plurality of ferreed stages, each of said stages including first and second magnetically remanent members, said first and second members having set windings thereon, said first members including in addition a reset winding thereon, steering and output contacts magnetically coupled to said stages, a set conductor coupled to said set windings for driving said members to a first magnetization state, two reset conductors respectively coupled to said reset windings of alternate ones of said stages for driving said magnetic members to the opposite magnetization state, means for connecting the steering contacts of a particular stage intermediate said set conductor and said set winding of a succeeding stage, and means for advancing said counter including means for energizing said set conductor followed by the energization of said first reset conductor and means for re-energizing said set conductor followed by the energization of said second reset conductor for driving said first members of said particular and succeeding stages to the same magnetic state while always maintaining the output contacts of said stages in opposing states.

10. A ferreed ring counter circuit including a plurality of parallel ferreed stages, each of said stages including a first and second magnetic remanent member, said first member having a set winding and a reset winding thereon, said second member having a set winding thereon, steering contacts and output contacts having a contact operating time substantially greater than the contact release time magnetically coupled to each of said stages, a set conductor coupled to each of said set windings and adapted to drive said first and second members to a first magnetization state, a first reset conductor respectively coupled to said reset windings of even ones of said stages to drive said first member to an opposite magnetization state, a second reset conductor coupled to said reset windings of odd ones of said stages for driving said first magnetic members to the opposite magnetization state, means for connecting said steering contacts of a particular stage intermediate said set conductor and said steering contacts of a succeeding stage, means for coupling said steering contacts of said final stage to said set windings of said initial stage to form a closed re-entrant path, means for advancing said counter including means for energizing said reset conductors to release said output contacts of a particular stage in a time period following the setting of said particular stage which is less than the contact operating time of said output contacts of said succeeding stage, and means for energizing said set conductor to drive said first members of said particular and succeeding stages to the same magnetic state while at all times maintaining the output contacts of said particular and succeeding stages in differing states.

No references cited.

NEIL C. READ, *Primary Examiner.*